(12) United States Patent
McDonald et al.

(10) Patent No.: US 9,308,961 B2
(45) Date of Patent: Apr. 12, 2016

(54) BICYCLE FRAME WITH CONVERTIBLE DROPOUTS

(71) Applicant: Specialized Bicycle Components, Inc., Morgan Hill, CA (US)

(72) Inventors: Jason S. McDonald, San Jose, CA (US); Jeremy Thompson, Aptos, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 34 days.

(21) Appl. No.: 14/091,501

(22) Filed: Nov. 27, 2013

(65) Prior Publication Data

US 2015/0145231 A1 May 28, 2015

(51) Int. Cl.
*B62K 25/02* (2006.01)

(52) U.S. Cl.
CPC .............. *B62K 25/02* (2013.01); *B62K 2206/00* (2013.01); *Y10T 29/4978* (2015.01); *Y10T 29/49815* (2015.01)

(58) Field of Classification Search
CPC .............................. B62K 25/02; B62K 2206/00
USPC ......................................................... 280/287
See application file for complete search history.

(56) References Cited

U.S. PATENT DOCUMENTS

| | | | | |
|---|---|---|---|---|
| 614,232 | A * | 11/1898 | Norton | 280/260 |
| 3,507,516 | A * | 4/1970 | Fritz | 280/279 |
| 3,610,659 | A * | 10/1971 | Gerarde | 280/169 |
| 3,976,307 | A * | 8/1976 | Ogisu | 280/279 |
| 4,121,850 | A * | 10/1978 | Ross | 280/279 |
| 4,805,941 | A * | 2/1989 | Downing et al. | 280/279 |
| 5,121,973 | A * | 6/1992 | Phillips | 301/110.5 |
| 6,089,675 | A * | 7/2000 | Schlanger | 301/124.2 |
| 7,044,874 | B2 * | 5/2006 | Shahana et al. | 474/82 |
| 7,562,942 | B2 | 7/2009 | D'Aluisio | |
| 7,654,548 | B2 * | 2/2010 | Kanehisa et al. | 280/279 |
| 7,661,767 | B2 * | 2/2010 | Montague et al. | 301/124.2 |
| 7,669,871 | B2 * | 3/2010 | Watarai | 280/279 |
| 7,731,214 | B2 * | 6/2010 | Laird | 280/279 |
| 7,837,213 | B2 * | 11/2010 | Colegrove et al. | 280/284 |
| 7,854,441 | B2 * | 12/2010 | Scurlock | 280/261 |
| 8,075,010 | B2 | 12/2011 | Talavasek et al. | |
| 8,113,529 | B2 | 2/2012 | Spahr et al. | |
| 8,113,594 | B2 | 2/2012 | Jones et al. | |
| 8,235,409 | B2 | 8/2012 | Colegrove et al. | |
| 8,424,894 | B2 | 4/2013 | Cleveland | |
| 8,424,975 | B2 | 4/2013 | Inoue et al. | |

(Continued)

*Primary Examiner* — Joseph Rocca
*Assistant Examiner* — Michael Stabley
(74) *Attorney, Agent, or Firm* — Michael Best & Friedrich LLP (57) ABSTRACT

The present invention provides a bicycle that includes a frame that is specifically design to accommodate different axle configurations. The bicycle includes a wheel including a wheel axle and a bicycle frame comprising a wheel support including an axle opening having a first width and an axle slot contiguous with the axle opening and having a second width less than the first width. Preferably, a portion of the wheel axle positioned in the axle opening has a diameter that substantially matches the first width. The present invention also provides a method of changing an original wheel of a bicycle. The method comprises removing the original wheel from the wheel support, positioning a converter in the axle opening, providing a replacement wheel having a replacement hub that has a replacement axle, and sliding the replacement axle through the axle slot and into the receiving area defined by the converter.

18 Claims, 8 Drawing Sheets

(56) References Cited

U.S. PATENT DOCUMENTS

| | | | |
|---|---|---|---|
| 8,783,790 B2 * | 7/2014 | Achenbach | ............... 301/124.2 |
| 2011/0309671 A1 | 12/2011 | Achenbach | |
| 2014/0049020 A1 * | 2/2014 | Wendt et al. | ................. 280/259 |

* cited by examiner

BICYCLE FRAME WITH CONVERTIBLE DROPOUTS

BACKGROUND

The present invention relates generally to the field of bicycles and specifically to bicycle frames that can be converted from a dropout adapted to receive a wheel axle of one size to a wheel axle of a different size.

Bicycles are available in a variety of different wheel sizes. For example, wheels can be designated with diameters of 26 inch, 27 inch, or 700 mm. In addition, wheels can come with different-sized axles having lengths such as 135 mm or 140 mm and diameters of 10 mm or 12 mm.

It is often desirable to convert a bicycle frame from accommodating a wheel of one size to a wheel of another size. For example, it might be desirable to convert a frame from receiving a rear wheel with a 135 mm axle spacing to a wheel with a 140 mm axle spacing.

SUMMARY

The present invention provides a bicycle that includes a frame that is specifically design to accommodate wheel of different axle configurations. Specifically, the bicycle includes a wheel including a wheel axle and a bicycle frame supported by the wheel. The frame includes a wheel support coupled to the wheel, and the wheel support includes an axle opening (e.g., extending laterally through the wheel support) having a first width and an axle slot contiguous with the axle opening and having a second width that is less than the first width. Preferably, a portion of the wheel axle positioned in the axle opening has a diameter that substantially matches the first width (e.g., the axle fits snugly into the axle opening).

In one embodiment, the wheel axle extends substantially all the way through the axle opening in the wheel support. In another embodiment, the bicycle further includes a converter at least partially positioned in the axle opening, the converter engaging at least a portion of the wheel axle. For example, the converter can include a flange positioned in the axle opening and defining an axle receiving area contiguous with the axle slot and having a third width that substantially matches the second width. Preferably, the converter includes an alignment feature for aligning the converter relative to the wheel support.

The present invention also provides a method of changing an original wheel of a bicycle. The bicycle includes a frame including a wheel support having an axle opening with a first width, at least a portion of an original axle being positioned in the axle opening. The wheel support further including an axle slot contiguous with the axle opening, the axle slot having a second width that is less than the first width. The method comprises removing the original wheel from the wheel support, positioning a converter at least partially in the axle opening (the converter defining an axle receiving area contiguous with the axle slot and having a third width smaller than the first width and preferably substantially matching the second width), providing a replacement wheel having a replacement hub that has a replacement axle, and sliding the replacement axle through the axle slot and into the receiving area defined by the converter.

In one embodiment, the axle opening extends laterally through the wheel support, and the step of removing the original wheel includes sliding the original axle laterally out of the axle opening. Preferably, the converter includes a first alignment feature and the wheel support includes a second alignment feature, and wherein the step of positioning the converter includes aligning the first alignment feature with the second alignment feature. After sliding the replacement axle, the method can further include the step of compressing the wheel support against the replacement hub (e.g., by inserting a skewer through the replacement axle and tightening the skewer).

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
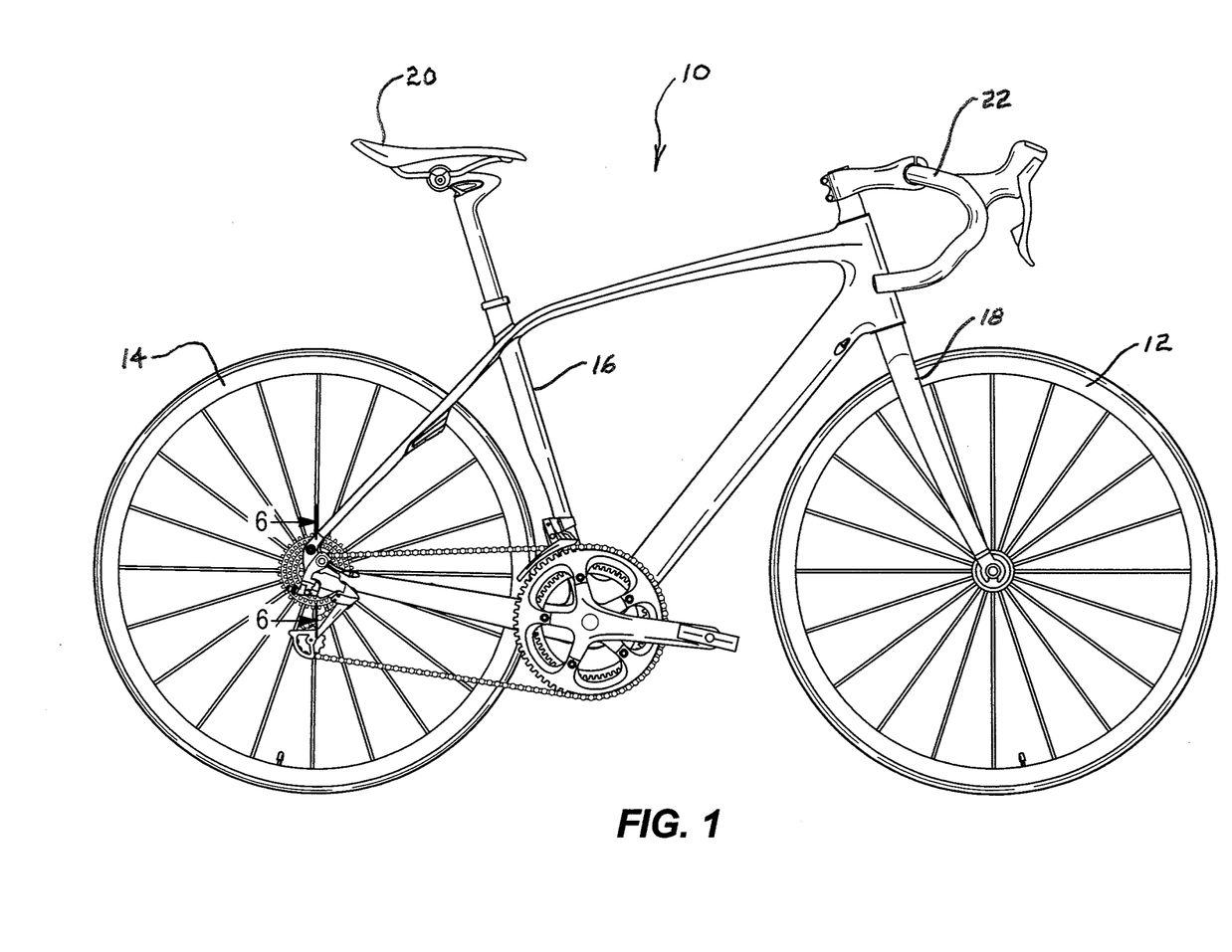
FIG. 1 is a side view of a bicycle embodying the present invention.
Figure 2:
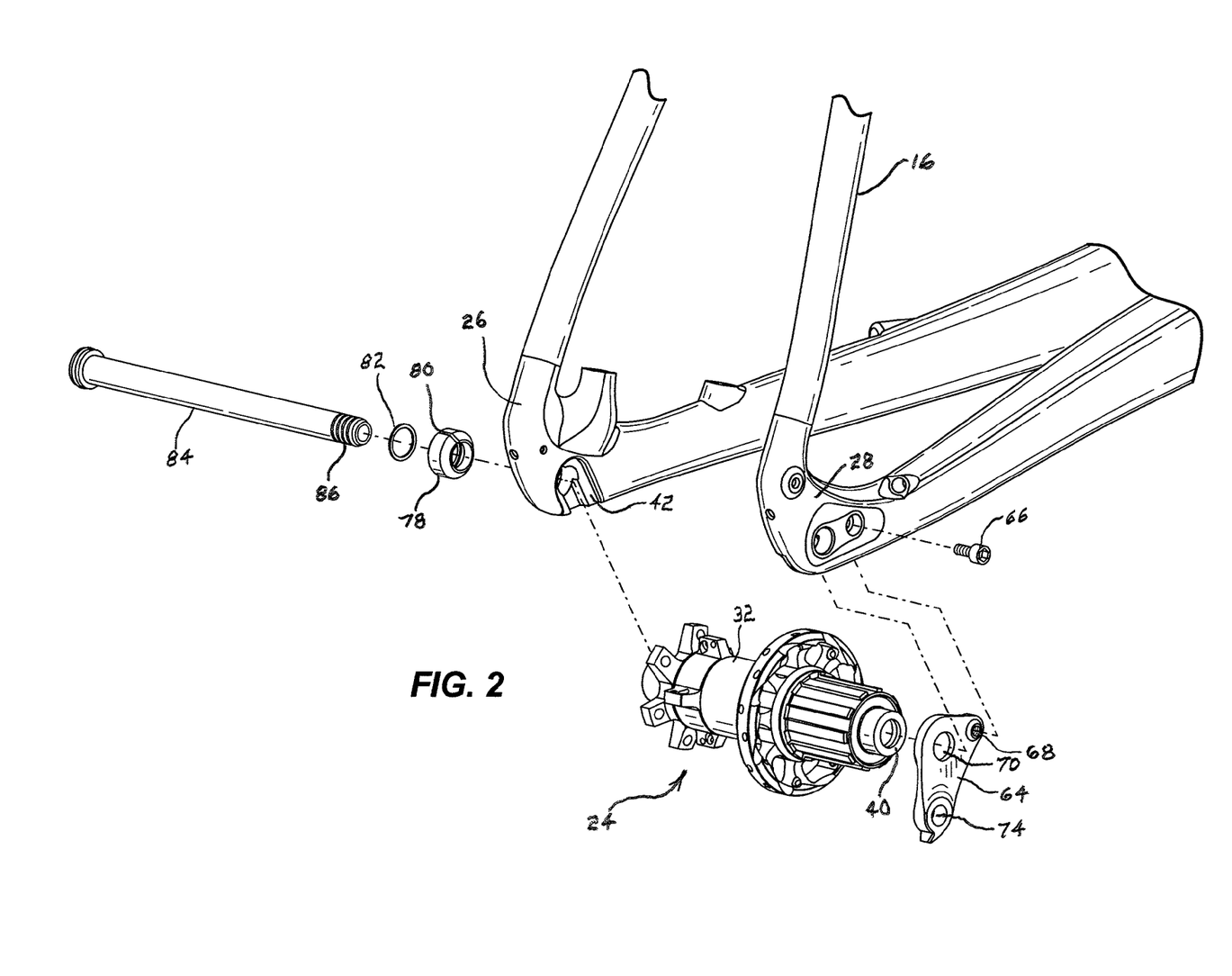
FIG. 2 is an exploded right perspective view of a first configuration of a rear wheel support for the bicycle of FIG. 1.
Figure 3:
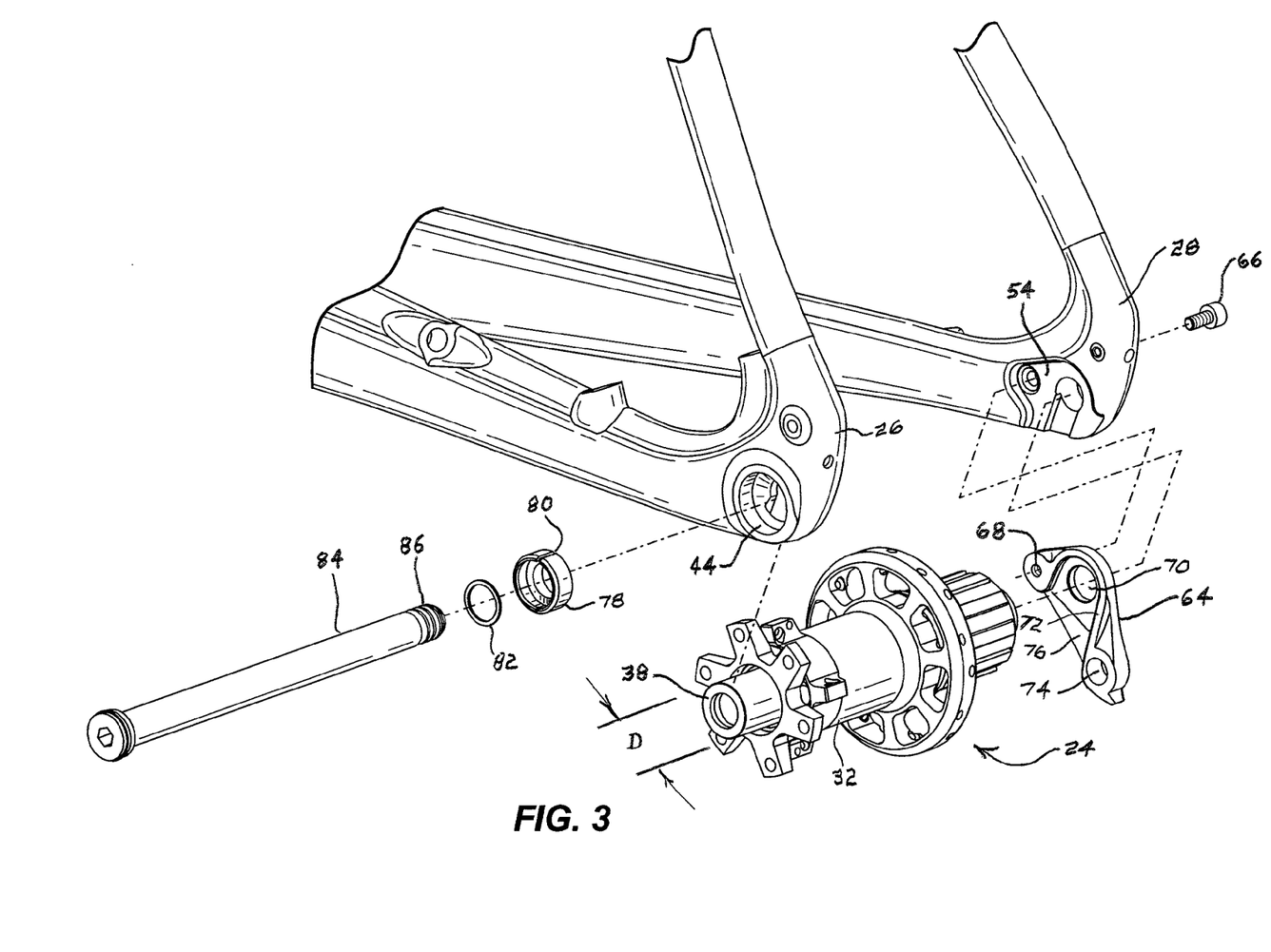
FIG. 3 is an exploded left perspective view of the first configuration.
Figure 4:
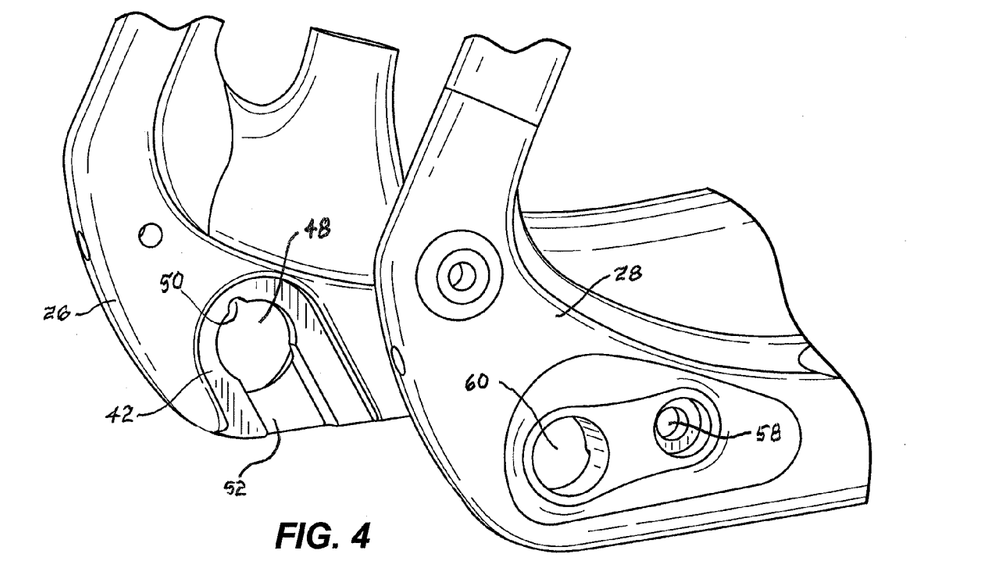
FIG. 4 is a right rear perspective view of a rear portion of the frame of FIG. 2.
Figure 5:
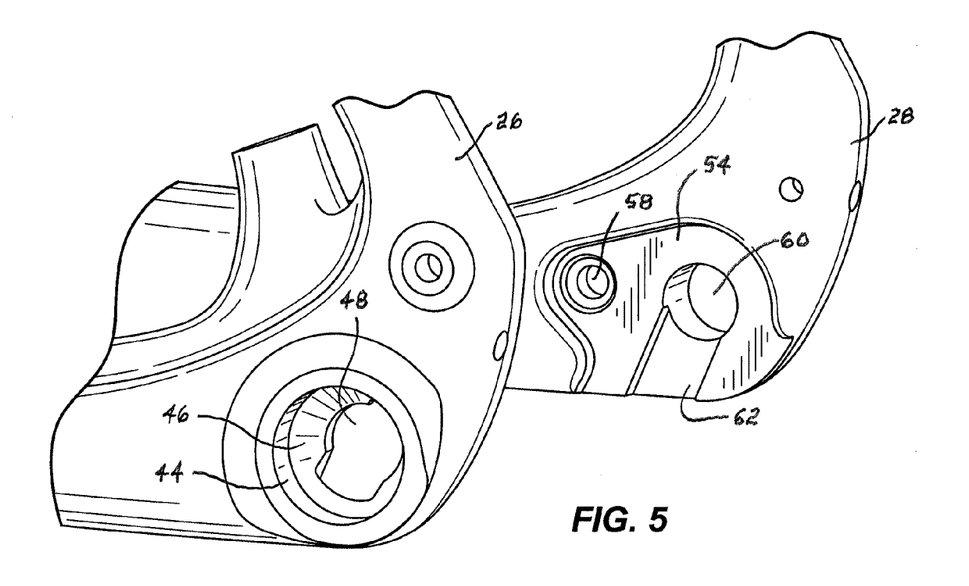
FIG. 5 is a left rear perspective view of a rear portion of the frame of FIG. 2.
Figure 6:
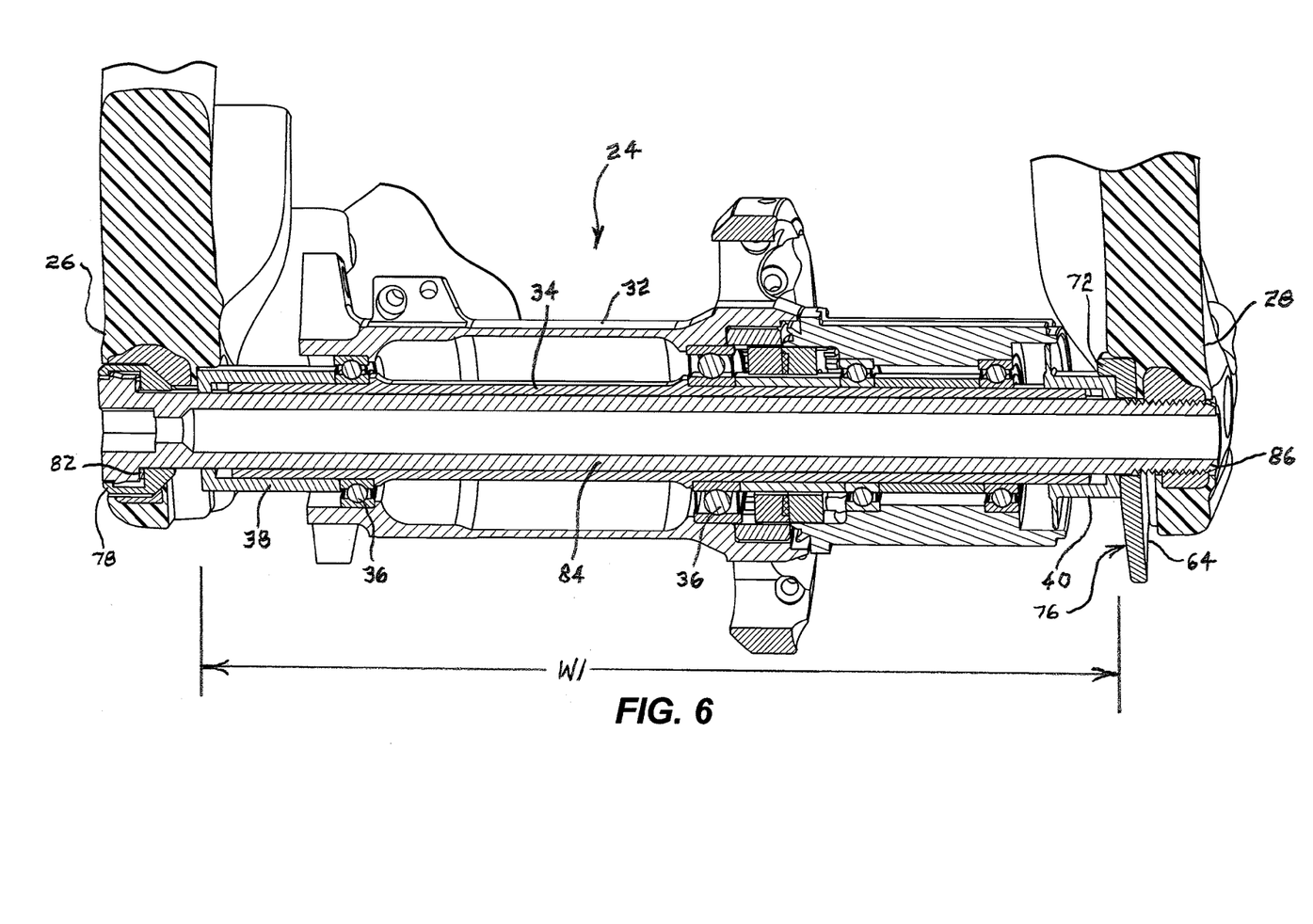
FIG. 6 is a vertical section view of the assembled first configuration of FIGS. 2-3.
Figure 7:
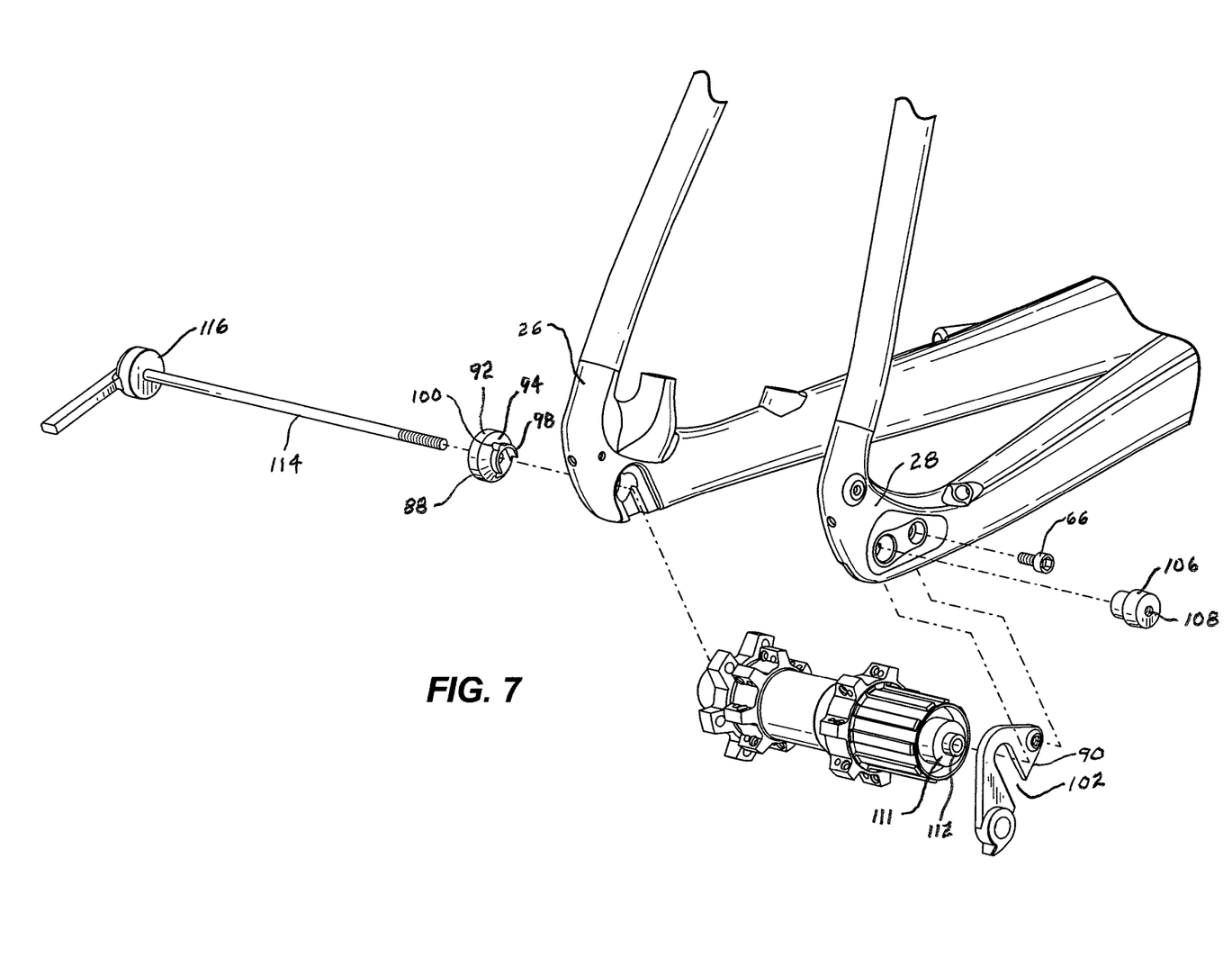
FIG. 7 is an exploded right perspective view of a second configuration of a rear wheel support for the bicycle of FIG. 1.
Figure 8:
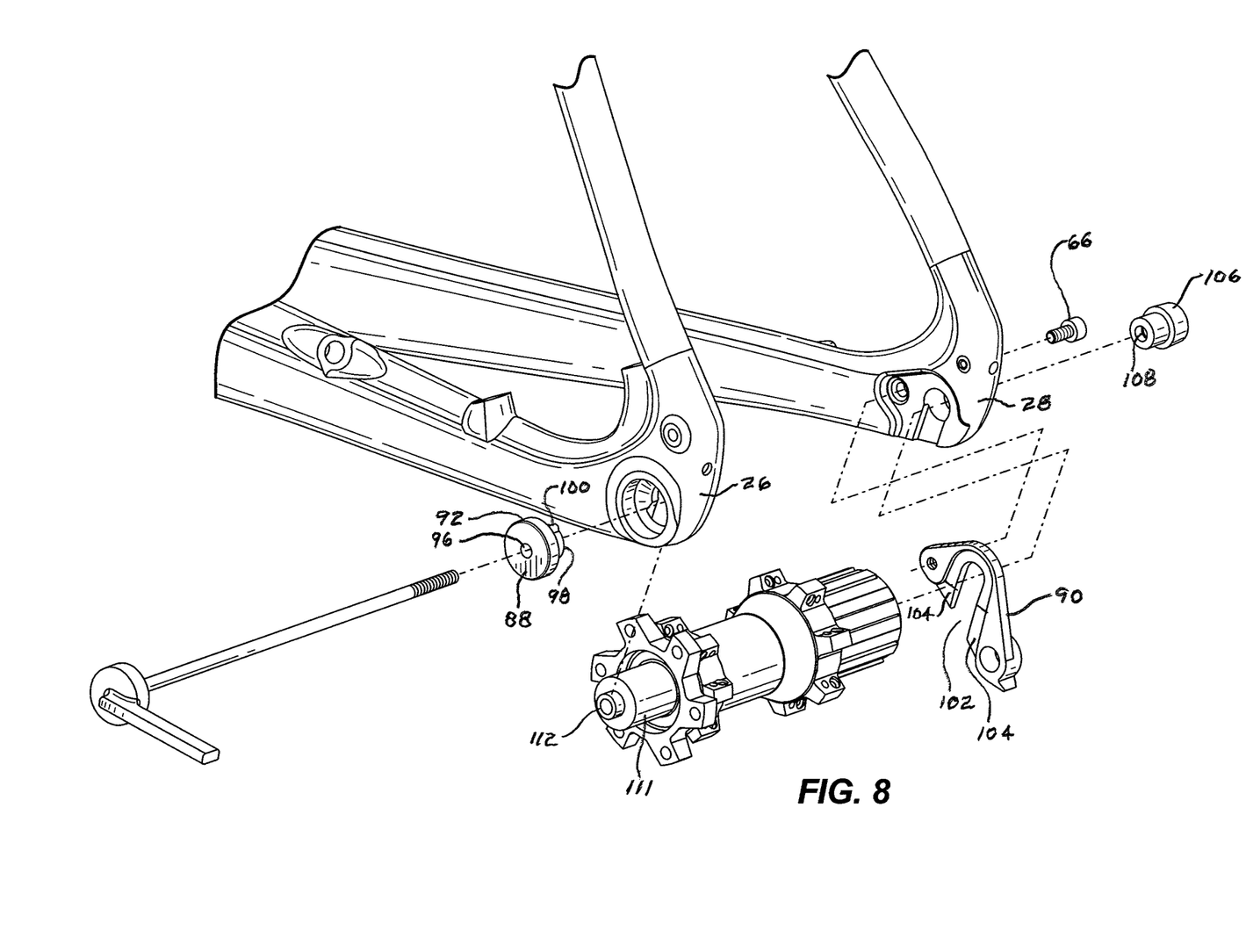
FIG. 8 is an exploded left perspective view of the second configuration.
Figure 9:
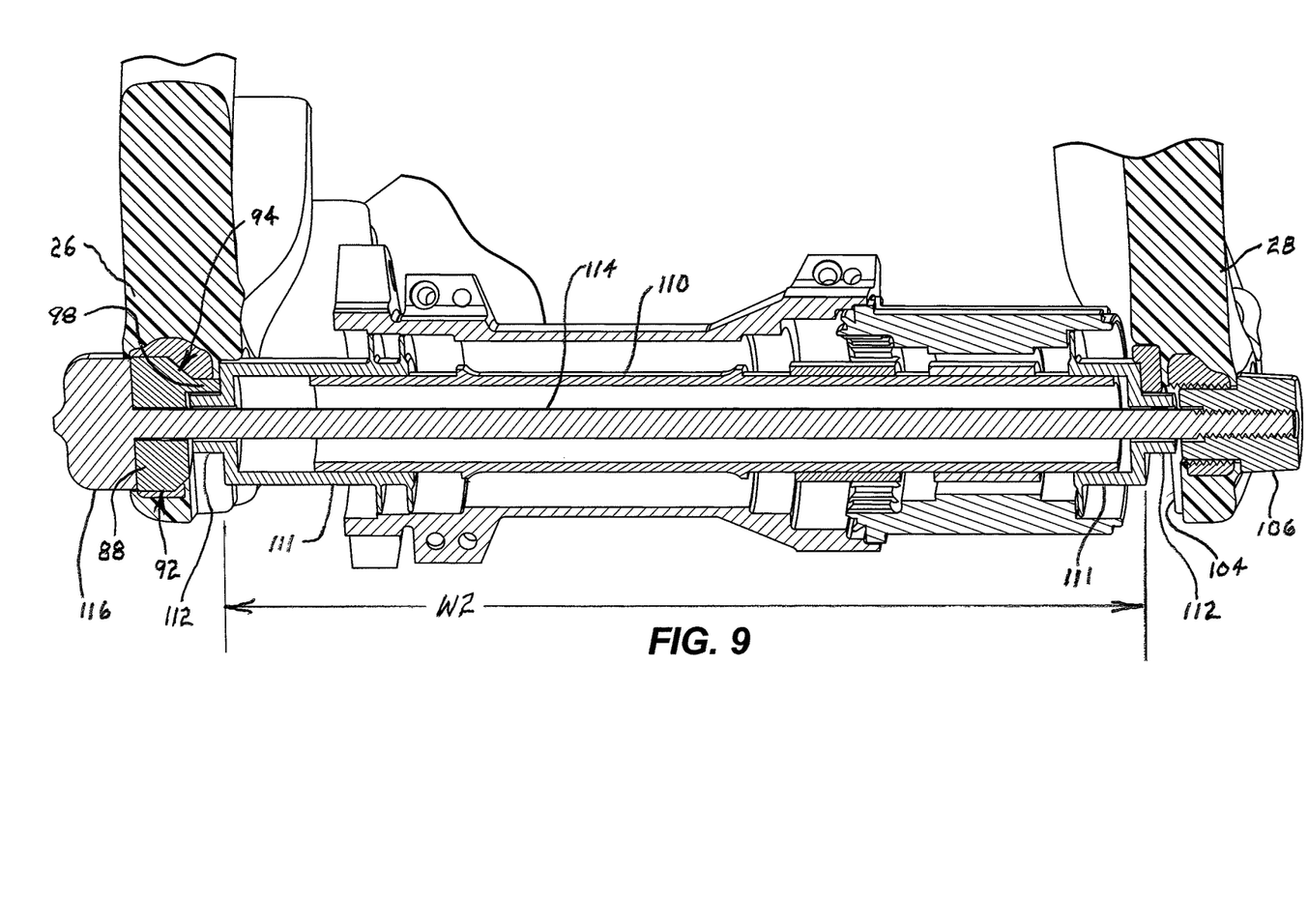
FIG. 9 is a vertical section view of the assembled second configuration of FIGS. 7-8.

FIG. 1 illustrates a bicycle 10 having front and rear wheels 12, 14, a frame 16 supported on the rear wheel 14, a front fork 18 supported on the front wheel 12, a seat 20, handlebars 22, and a rear derailleur 23 as is generally known in the art. Referring to FIG. 2, the rear wheel 14 includes a hub 24 that is mounted to left and right wheel supports 26, 28 (commonly called dropouts) on a rear portion of the frame 16. The wheel supports 26, 28 of the illustrated frame 16 are designed to accommodate hubs having at least two different configurations. A first hub 24 having a first configuration is illustrated in FIGS. 2-6, and a second hub 30 having a second configuration is illustrated in FIGS. 7-9.

Referring to FIGS. 2-5, the first hub 24 includes a first body 32 rotationally mounted on a main axle 34 by two wheel bearings 36. Left and right spacers 38, 40 fit over the ends of the main axle 34 to achieve an overall hub width W1, which in the illustrated embodiment is about 135 mm. Each of the spacers 38, 40 includes a spacer diameter D, which in the illustrated embodiment is about 19 mm.

The left wheel support 26 (FIGS. 2 and 4) includes a left hub slot 42 formed on an inner face of the left wheel support 26. The left hub slot 42 is dimensioned to receive the left spacer 38 of the first hub 24. The outer surface of the left wheel support (FIGS. 3 and 5) includes a cylindrical recess 44 terminating in a frusto-conical wall 46. A left axle opening 48 extends through the left wheel support and has a width (diameter) of about 12 mm. An alignment recess 50 (FIG. 4) also extends through the left wheel support 26 and is contiguous with the left axle opening 48. The inner face of the left wheel support 26 further includes a left axle slot 52 contiguous with the left axle opening 48. The left axle slot 52 extends only partially into the inner face of the left wheel support 26, and has a width of about 10 mm.

The right wheel support 28 includes an inner face (FIGS. 3 and 5) having a recess 54 dimensional to receive a derailleur hanger. The right wheel support 28 further includes a hanger mount hole 58 extending laterally all the way through the right wheel support 28. The right wheel support 28 further includes a threaded right axle opening 60 extending all the way through the right wheel support 28 and having a width (diameter) of about 12_ mm. A right axle slot 62 is formed in the inner face of the right wheel support 28 and is contiguous with the right axle opening 60. The illustrated right axle slot 62 extends only partially into the right wheel support 28 and has a width of about 10 mm.

When it is desired to insert the above-described first hub 24 into the wheel supports 24, 28 of the frame 16, the frame 16 is first provided with a closed hanger 64 (FIG. 3) on the right wheel support 28. More specifically, the closed hanger 64 is positioned in the recess 54 on the inner face of the right wheel support 28, and a hanger attachment bolt 66 is inserted through the hanger mount hole 58 of the right wheel support 28 and threaded into a threaded opening 68 in the closed hanger 64. In this manner, the closed hanger 64 is secured to the inner face of the right wheel support 28. The closed hanger 64 includes a hanger opening 70 having a width (diameter) of about 12 mm that is aligned with the right axle opening 60 when the closed hanger 64 is secured in the recess 54 of the right wheel support 28. The closed hanger 64 further includes a lip 72 extending partially circumferentially around the hanger opening 70. The closed hanger 64 further includes a threaded derailleur mount hole 74 configured to receive the rear derailleur 23, as is known in the art. The closed hanger 64 further includes a ramped surface 76 that guides the first hub 24 into the closed hanger 64, as described below in more detail.

A through-axle assembly is provided to secure the first hub 24 to the wheel supports 26,28. The through-axle assembly includes a split plug 78, a washer 82, and a through axle 84 having a threaded end 86. All three parts of the through-axle assembly are retained in an assembled condition due to a lip on the split plug 78 that engages a groove in the head of the through axle 84, as shown in FIG. 6.

In order to mount the first hub 24 between the left and right wheel supports 26, 28, the first hub 24 is arranged such that the left spacer 38 is aligned with the left hub slot 42 and the right spacer 40 is aligned with the ramped surface 76 on the closed hanger 64. The first hub 24 is then moved upward until the left spacer 38 is fully seated in the left hub slot 42 and aligned with the left axle opening 48 and the right spacer 40 is fully seated into engagement with the lip 72 and aligned with the hanger opening 70. With the first hub 24 held in this position, the through axle assembly 80,82,84 is inserted through the left axle opening 48, through the first hub 24, through the hanger opening 70, and threaded into the right axle opening 60. The through axle 84 has a diameter of about 12 mm to substantially match (e.g., slide snugly through) the diameter of the left axle opening 48. Tightening of the through axle 84 in this position results in the first hub 24 being secured to the frame 16.

When it is desired to instead use the second hub 30, the first hub 24 is removed from the frame 16 by removing the through axle assembly 80,82,84, and sliding the first hub 24 out through the left hub slot 42 and closed hanger 64. A converter plug 88 is inserted into the recess 44 in the left wheel support 26, and the closed hanger 64 is replaced with an open hanger 90. The converter plug 88 includes a cylindrical surface 92 and a frusto-conical surface 94 that are dimensioned to fit into the recess 44 in the outer face of the left wheel support 26. The converter plug 88 further includes a skewer opening 96 extending through the converter plug 88, and a flange 98 extending partially circumferentially around the skewer opening 96. The flange 98 is dimensioned to fit into the left axle opening 48 and defines an axle receiving area having a width that substantially matches the width of the left axle slot 52. The flange 98 is provided with an alignment boss 100 that is dimensioned to be received in the alignment recess 50.

The open hanger 90 includes a hanger slot 102 having a width that substantially matches the width of the right axle slot 62. The open hanger 90 further includes ramped surfaces 104 on opposing sides of the hanger slot 102. When being configured to receive the second hub 30, a converter nut 106 is inserted through the outer face of the right wheel support 28 and into the right axle opening 60. The converter nut 106 includes a partially threaded opening 108 extending all the way through.

The second hub 30 includes a main axle 110 and bearings (now shown) similar to the embodiment of FIGS. 2-6. However, the left and right spacers 111 of this second hub 30 include small-diameter ends 112 that extend outward. The width W2 of the second hub 30, not including the small-diameter ends 112, is about 135 mm. In order to mount the second hub 30 to the frame 16, the left and right ends 112 of the small axle 110 are aligned with the left and right axle slots 52, 62, respectively. It is noted that the hanger slot 102 is aligned with the right axle slot 62, and therefore the right end 112 of the axle 110 will also be aligned with the hanger slot 102. The second hub 30 is then moved upward so that the left and right ends 112 of the small axle 110 slide through the corresponding slots until the left end 112 of the small axle 110 is fully seated into the flange 98 of the converter plug 88 and the right end 112 of the small axle 110 is fully seated into the end of the hanger slot 102. With the parts properly aligned, a skewer rod 114 inserted through the converter plug 88, through the small axle 110, and into the converter nut 106. The skewer rod 114 is threaded into the converter nut 106 to the desire a mount, and a skewer cam 116 rotated to compress the wheel supports 26, 28 to the second hub 30, as is generally known in the art.

Various features of the invention are set forth in the following claims.

The invention claimed is:
1. A bicycle comprising:
a wheel including a wheel axle; and
a bicycle frame supported by the wheel, the frame including a wheel support coupled to the wheel, the wheel support including:
an axle opening having a first width, at least a portion of the wheel axle being positioned in the axle opening;
a first axle slot contiguous with the axle opening, the first axle slot having a second width that is less than the first width and sized to accommodate a first hub having an end with a first diameter; and
a second axle slot contiguous with the axle opening, the second axle slot having a third width larger than the second width and sized to accommodate a second hub having an end with a second diameter that is different from the first diameter, wherein the wheel axle portion positioned in the axle opening has a diameter that is larger than the second width of the first axle slot.

2. A bicycle as claimed in claim 1, wherein the axle opening extends laterally through the wheel support.

3. A bicycle as claimed in claim 1, wherein the diameter of the wheel axle portion substantially matches the first width.

4. A bicycle as claimed in claim 3, wherein the wheel axle extends substantially all the way through the axle opening in the wheel support.

5. A bicycle as claimed in claim 1, further comprising a converter at least partially positioned in the axle opening, the converter engaging at least a portion of the wheel axle.

6. A bicycle as claimed in claim 5, wherein the converter includes a flange positioned in the axle opening and defining an axle receiving area contiguous with the second axle slot and having a fourth width that substantially matches the second width.

7. A bicycle as claimed in claim 5, wherein the converter includes an alignment feature for aligning the converter relative to the wheel support.

8. A bicycle frame comprising a wheel support adapted to receive a bicycle wheel having a wheel axle, the wheel support including:
  an axle opening having a first width;
  a first axle slot contiguous with the axle opening, the first axle slot having a second width that is less than the first width and sized to accommodate a first hub having an end with a first diameter; and
  a second axle slot contiguous with the axle opening, the second axle slot having a third width larger than the second width and sized to accommodate a second hub having an end with a second diameter that is different from the first diameter,
  wherein the first axle slot extends laterally only partially through the wheel support.

9. A bicycle frame as claimed in claim 8, wherein the axle opening extends laterally through the wheel support.

10. A bicycle as claimed in claim 8, further comprising a converter at least partially positioned in the axle opening, the converter adapted to receive at least a portion of the wheel axle.

11. A bicycle as claimed in claim 10, wherein the converter includes a flange positioned in the axle opening and defining an axle receiving area contiguous with the first axle slot and having a fourth width that substantially matches the second width.

12. A bicycle as claimed in claim 10, wherein the converter includes an alignment feature for aligning the converter relative to the wheel support.

13. A method of changing an original wheel of a bicycle having a frame including a wheel support, the original wheel having an original axle, and the wheel support including an axle opening having a first width, at least a portion of the original axle being positioned in the axle opening, and the wheel support further including an axle slot contiguous with the axle opening, the axle slot having a second width that is less than the first width, the method comprising:
  removing the original wheel from the wheel support;
  positioning a converter at least partially in the axle opening, wherein the converter defines an axle receiving area contiguous with the axle slot and having a third width smaller than the first width;
  providing a replacement wheel having a replacement hub that has a replacement axle; and
  sliding the replacement axle through the axle slot and into the receiving area defined by the converter.

14. A method as claimed in claim 13, wherein the axle opening extends laterally through the wheel support, and wherein removing the original wheel includes sliding the original axle laterally out of the axle opening.

15. A method as claimed in claim 13, wherein the converter includes a first alignment feature and the wheel support includes a second alignment feature, and wherein positioning the converter includes aligning the first alignment feature with the second alignment feature.

16. A method as claimed in claim 13, wherein the third width substantially matches the second width.

17. A method as claimed in claim 13, further comprising, after the step of sliding the replacement axle, the step of compressing the wheel support against the replacement hub.

18. A method as claimed in claim 17, wherein compressing includes inserting a skewer through the replacement axle and tightening the skewer.

* * * * *